(12) United States Patent
Prasanna

(10) Patent No.: US 6,667,976 B1
(45) Date of Patent: Dec. 23, 2003

(54) FUZZYCAST SERVICE IN SWITCHES

(75) Inventor: G. N. Srinivasa Prasanna, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/457,770

(22) Filed: Dec. 9, 1999

(51) Int. Cl.$^7$ ............................ H04L 12/28; G01R 31/08
(52) U.S. Cl. ...................... 370/390; 370/231; 370/389; 370/395.31
(58) Field of Search ................. 370/390, 254, 370/229, 432, 400, 389, 391, 392, 351, 408, 396, 256, 231, 235, 236, 417, 412, 395.31, 395.32; 709/238, 240, 242, 245

(56) References Cited

U.S. PATENT DOCUMENTS

| | | | |
|---|---|---|---|
| 5,243,596 A | | 9/1993 | Wells |
| 5,313,454 A | | 5/1994 | Corbalis |
| 5,361,256 A | * | 11/1994 | Doeringer et al. .......... 370/390 |
| 5,535,195 A | * | 7/1996 | Lee ............................ 370/256 |
| 5,541,927 A | * | 7/1996 | Kristol et al. ............... 370/256 |
| 5,805,569 A | * | 9/1998 | Lindqvist et al. ........... 370/229 |
| 5,856,974 A | | 1/1999 | Perlman |
| 5,862,128 A | | 1/1999 | Rathke |
| 5,898,669 A | | 4/1999 | Bar-Eli |
| 5,905,871 A | | 5/1999 | Siddiqui |
| 6,078,590 A | * | 6/2000 | Farinacci et al. ............ 370/432 |
| 6,122,251 A | * | 9/2000 | Shinohara .................... 370/231 |
| 6,122,672 A | * | 9/2000 | Vyaznikov et al. ......... 709/238 |
| 6,201,792 B1 | * | 3/2001 | Lahat .......................... 370/236 |
| 6,549,938 B1 | * | 4/2003 | Kilkki et al. ................ 370/389 |

OTHER PUBLICATIONS

S. Bhattacharjee, et al, "Application–Layer Anycasting", Proc. of IEEE Infocom'98.
Z. Fei, et al, "A Novel Server Selection Technique for Improving the Response Time of a Replicated Service", Proc. of IEEE Infocom'98.

* cited by examiner

Primary Examiner—Hassan Kizou
Assistant Examiner—Hanh Nguyen

(57) ABSTRACT

A communications service is provided for packet networks such as the Internet (herein termed "fuzzycast" service ) which provides statistical assurance that, on the average, all destinations get some percentage of offered traffic. The switch, at a router or ATM node, services a fuzzycast message by estimating the congestion on the route specified by the IP protocol header. The switch is free to temporarily drop those destinations whose routes are congested, as determined, for example, from the length of the outgoing queue. For each fuzzycast message, a subset K of the M destinations is chosen, advantageously by using a random number generator, and the message is sent to the chosen destinations, if possible.

6 Claims, 1 Drawing Sheet

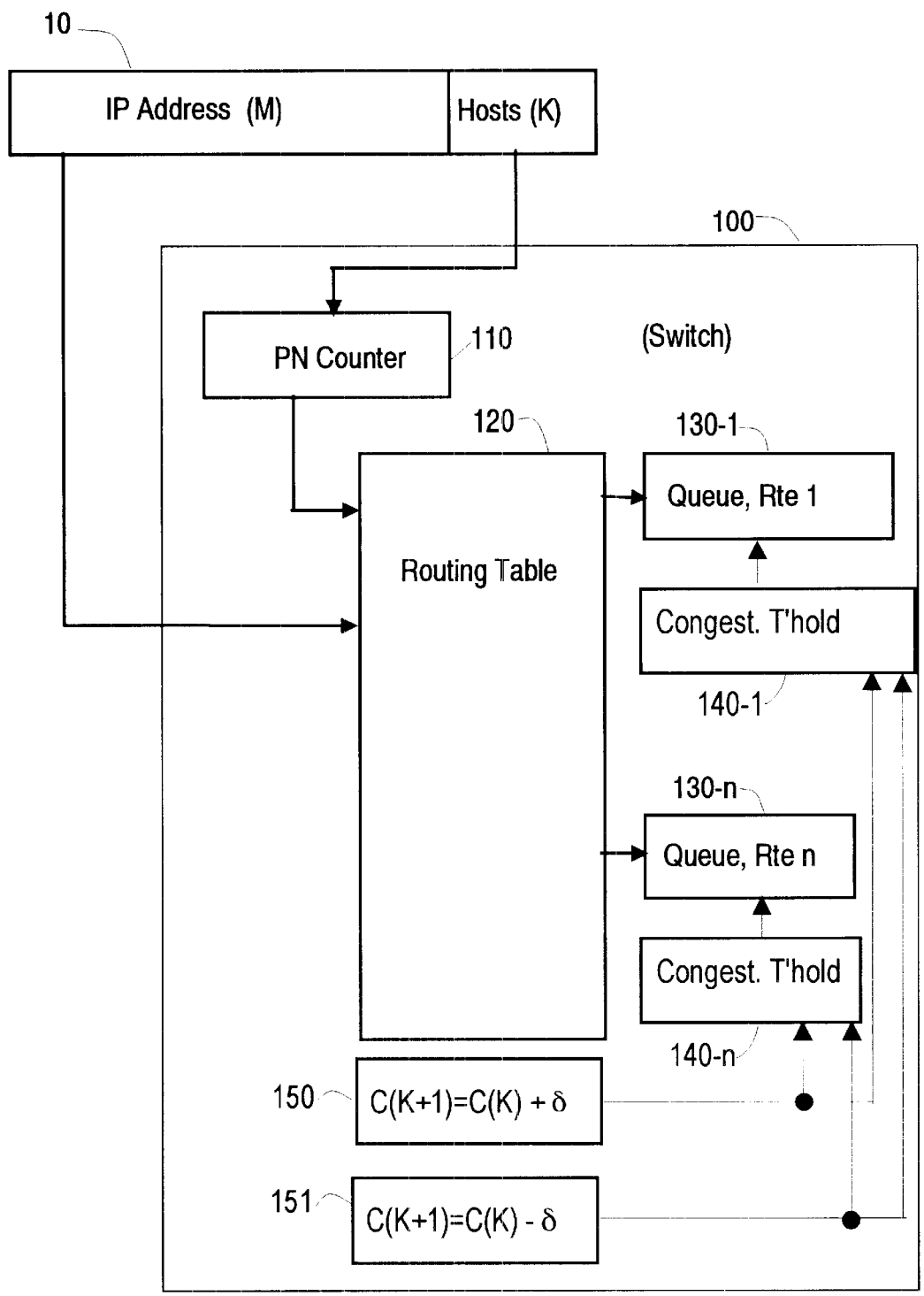

FUZZYCAST SERVICE IN SWITCHES

FIELD OF THE INVENTION

This invention relates to network services and, more particularly, to delivering messages to a large number of users that may be geographically wide-spread.

BACKGROUND OF THE INVENTION

Heretofore a network service known as multicasting has been described as offering the ability to broadcast a particular message to several different destinations. The well-known internet protocol offers the ability to provide such service to a large number of users that are geographically wide-spread. Briefly, the internet is a hierarchically-arranged distributed internetwork system having a plurality of routing domains coupled to a backbone network. Each routing domain is a collection of one or more local networks that is attached to the backbone through one or more nodes known as routers.

Certain multicasting applications involve real-time traffic, such as video conferencing, and require a strict guarantee as to end-to-end latency. Another type of multicasting application, such as software distribution, does not have a strict limit on end-to-end latency, but requires complete accuracy of transmission. Other multicasting applications have intermediately stringent requirements on end-to-end delay and accuracy of transmission. U.S. Pat. No. 5,905,871 entitled "Method of Multicasting", issued May 18, 1999 and assigned to the assignee of the present application, discloses a protocol for transmitting multicast data segments and for receiving a packet status signal from any receiver that has joined the multicast. The status signal indicates the reception status of received data packets so that the sender can retransmit any missing packets. A somewhat similar service, termed "anycast" service, is described in an article by Bhattacharjee et al entitled "Application-Layer Anycasting", Proc. of IEEE Infocom 1998. The IP anycast address defines a group of servers that provide the same service. A sender desiring to communicate with only one of the servers sends datagrams with the IP anycast address in the destination address field. Using anycast-aware routers the sending node then routes the datagram to at least one of the servers identified by the anycast address.

While these prior art systems provide useful features, it would be more useful for the messaging service to reflect the realities of the switching network in which traffic conditions may prevent the completion of connections to some of the desired destinations. For, example, in polling applications, where addresses have to be sampled roughly uniformly, it would be desirable for the messaging service to provide some measure of statistical assurance that at least a given number of the addresses have been reached.

SUMMARY OF THE INVENTION

In accordance with the principles of the invention, a service is provided (herein termed "fuzzycast" service ) which provides statistical assurance that, on the average, all destinations get some percentage of offered traffic. The switch, at a router or ATM node, services a fuzzycast message by estimating the congestion on the route specified by the IP protocol header. The switch is free to temporarily drop those destinations whose routes are congested, as determined, for example, from the length of the outgoing queue. For each fuzzycast message, a subset K of the M destinations is chosen, advantageously by using a random number generator, and the message is sent to the chosen destinations, if possible.

BRIEF DESCRIPTION OF THE DRAWING

The foregoing and other features of the invention may become more apparent from a reading of the ensuing description, together with the drawing, the single FIGURE of which shows the implementation of fuzzycast messaging service at a switching node.

GENERAL DESCRIPTION

In the exemplary embodiment of the invention, a switch 100 receives a fuzzycast request 10 in the form of a packet which specifies the set (M) of all allowed destinations as well as the number (K) of required destinations. Both (M) and (K) are conveniently specified in the IP protocol header. In IP terminology, the set of all allowed destinations may be specified as a "subnet" which corresponds to all combinations of the host field in the IP header (low order bits of address). At switch 100, and at any switch located at an intermediate node between the originating node and the destination indicated in the fuzzycast message, the following is done K times: a) a pseudo random host address is appended to the host field of the packet; b) the outgoing link is looked up in the routing table in the same manner as for conventional unicast; c) the packet is then forwarded on the outgoing link (modulo the congestion, and other effects described below), with as much of the host field filled-in as required to match the maximally matching prefix in the routing table. The lower order bits which do not match the prefix are left unfilled and will be randomly set by downstream nodes. In other words, the addition of a pseudo-random address suffix to the fuzzycast address (incomplete in a unicast sense) is followed by a conventional routing table lookup of the resulting unicast address. Fuzzycast messages are minimally differentiated, to at best one of a few classes of fuzzycast. Congestion thresholds are for the entire class, only they are local to the switch.

If an outgoing link is not available at switch 100 because the appropriate routes are congested, as indicated by outgoing queue length on the link exceeding some predetermined congestion threshold, the packet is not sent on that link. A congestion threshold may be stored in a respective register 140-1 through 140-n for each link. Alternatively, instead of storing a congestion threshold indication for each link, switch 100 may optionally store a single threshold which generally reflects congestion of all outgoing links 130-1 through 130-n. To provide fuzzycast service in as economical manner as possible, no indication that the message has been dropped or delayed is sent. A high speed implementation with the ability to incorporate link congestion into the fuzzycast message is being filed as an addendum to this application.

If excessive congestion was noted in an earlier transmission, the congestion threshold for the next packet may optionally be decreased. If an individual threshold counter is maintained for each link, it can be updated (within pre-specified minima/maxima) by logic 150 according to: $C(K+1)=C(K)-\delta$, if the $K^{th}$ packet is dropped due to queue length exceeding the congestion threshold level $C(K)$ and by logic 151 according to $C(K+1)=C(K)+\delta$, if the $K^{th}$ packet is successfully sent.

All links share the same threshold for all connections. A small number of different fuzzycast connection classes can be incorporated by using multiple thresholds such as the priority level of a message. The random host address selection may be generalized to include random selection of subnetworks, sets of subnetworks, and eventually the entire IP address space.

Conclusion

Fuzzycast differs from anycast and multicast in that it does not require setup or tear down of a group. No group membership is enforced. Existence of a valid unicast IP-address is sufficient for a host to be a valid recipient of a fuzzycast packet. As opposed to multicast and anycasst, the recipient need not even know apriori that it is in a fuzzycast group. Recipients may receive packets fuzzycast to different fuzzycast groups simultaneously. Fuzzycasst attempts to statistically guarantee that all host addresses in the subnet will be eventually generated. Anycast does not care if the same set of K host addresses is repeatedly generated. The statistical guarantee is required for application like polling, where addresses have to be sampled roughly uniformly. It is clear that sophisticated implementations of fuzzycast, keeping track of number of packets delivered to different hosts, can provide very sophisticated statistical guarantees (e.g, uniform sampling to within a maximum specified variance, etc.), without involvement of the application layer. It is hard to do this at the application layer, since host address are generally known only within their specific subnet.

The foregoing is deemed to be illustrative of the principles of the invention. Further and other modifications will be apparent to those skilled in the art without however departing from the spirit and scope of the invention.

What is claimed is:

1. A method of handling a message addressed to a plurality of destinations, comprising the steps of:

a) accessing a routing table to ascertain the routes corresponding to a subnetwork serving the destinations;

b) designating to said routing table a random set of said destinations required to be reached;

c) ascertaining the congestion on the routes designated to said routing table;

d) sending said message to uncongested ones of said routes;

e) delaying the sending of said message to congested ones of said routes;

f) storing an indication of which routes are associated with delayed messages; and g) accommodating a small number of different fuzzycast connection classes according to the priority level of said message.

2. A method according to claim 1, wherein a congestion threshold is measured by outgoing queue length.

3. A method according to claim 2, wherein said uncongested ones of said routes are routes having a queue length less than said threshold.

4. A method of handling a packet at any switch located at an intermediate node between an originating node and a destination node, comprising:

a) appending a pseudo random host address to the host field of the packet;

b) determining an outgoing link from a routing table in the same manner as for unicast packets; and c) forwarding the packet on the outgoing link modulo the link congestion.

5. A method of handling a packet according to claim 4, wherein said host field is filled-in as required to match the maximally matching prefix in the routing table.

6. A method of handling a packet according to claim 5 wherein lower order bits which do not match the prefix are left unfilled at the switch to be randomly set by downstream nodes.

* * * * *